(12) United States Patent
Sladek

(10) Patent No.: US 7,917,268 B2
(45) Date of Patent: Mar. 29, 2011

(54) VEHICLE CLUTCH ENGAGEMENT CONTROL SYSTEM AND METHOD

(75) Inventor: Thomas Sladek, Hilliard, OH (US)

(73) Assignee: Honda Motor Co., Ltd, Tokyo (JP)

( * ) Notice: Subject to any disclaimer, the term of this patent is extended or adjusted under 35 U.S.C. 154(b) by 1016 days.

(21) Appl. No.: 11/735,534

(22) Filed: Apr. 16, 2007

(65) Prior Publication Data
US 2008/0254938 A1  Oct. 16, 2008

(51) Int. Cl.
*G06F 7/00* (2006.01)
*G06F 17/00* (2006.01)
(52) U.S. Cl. ............. 701/67; 701/68; 477/158; 477/86; 477/156; 74/DIG. 1
(58) Field of Classification Search ............. 701/67–68; 477/70, 166, 168, 156–158, 86, 106; 74/DIG. 1
See application file for complete search history.

(56) References Cited

U.S. PATENT DOCUMENTS

| | | | | |
|---|---|---|---|---|
| 1,983,225 A | * | 12/1934 | Gregg ..................... 123/559.3 |
| 2,933,168 A | * | 4/1960 | Leibing et al. ............. 477/174 |
| 3,077,122 A | * | 2/1963 | Olsen ........................ 477/97 |
| 3,295,388 A | * | 1/1967 | Groves ....................... 477/97 |
| 3,308,677 A | * | 3/1967 | Van Lent et al. .............. 477/97 |
| 4,733,580 A | * | 3/1988 | Kubo et al. ................. 477/129 |
| 4,943,921 A | | 7/1990 | Baltusis et al. |
| 5,107,724 A | * | 4/1992 | Takizawa .................... 477/97 |
| 5,166,879 A | | 11/1992 | Greene et al. |
| 5,323,322 A | | 6/1994 | Mueller et al. |
| 5,415,606 A | * | 5/1995 | Kovalsky et al. ............ 477/148 |
| 5,475,590 A | * | 12/1995 | Palansky et al. ............... 701/67 |
| 5,475,591 A | * | 12/1995 | Suzuki et al. ................. 701/98 |
| 5,481,462 A | * | 1/1996 | Nagai ........................ 701/101 |
| 5,568,386 A | * | 10/1996 | Sugiura et al. ................. 701/51 |
| 5,698,779 A | * | 12/1997 | Yoshioka .................. 73/114.32 |
| 5,777,211 A | * | 7/1998 | Binienda et al. ............. 73/53.05 |

(Continued)

FOREIGN PATENT DOCUMENTS
JP   4-094389   *   4/1992
(Continued)

OTHER PUBLICATIONS

Implementation of On-Line Clutch Prssure Estimation for Stepped Automatic Transmission, Watechagit et al., 2005 American Control Conference, Jun. 8-10, 2005, Portland, OR. USA, pp. 1607-1612.*

(Continued)

*Primary Examiner* — Cuong H Nguyen
(74) *Attorney, Agent, or Firm* — Mark E. Duell; Michael A. Forhan; Eley Law Firm Co.

(57) ABSTRACT

A clutch engagement control system for a vehicle transmission. The system comprises an automatic transmission gearset and at least one hydraulic clutch coupled to the gearset. A hydraulic pressure controller is coupled to the clutch. A clutch engagement controller is coupled to the pressure controller, and an altitude sensor is coupled to the clutch engagement controller. The clutch engagement controller is configured to receive from the altitude sensor an altitude signal corresponding to the altitude of the vehicle. The clutch engagement controller adjusts a hydraulic pressure request of the pressure controller in accordance with the altitude signal, such that the clutch engages with at least one of a rate and pressure corresponding to the sensed altitude. A method employs the system.

20 Claims, 3 Drawing Sheets

U.S. PATENT DOCUMENTS

| | | | |
|---|---|---|---|
| 5,995,895 | A | 11/1999 | Watt et al. |
| 6,052,644 | A | 4/2000 | Murakami et al. |
| 6,070,118 | A | 5/2000 | Ohta et al. |
| 6,278,928 | B1 | 8/2001 | Aruga et al. |
| 6,293,267 | B1 * | 9/2001 | Smith et al. ............... 123/568.22 |
| 6,367,447 | B1 | 4/2002 | Palansky et al. |
| 6,625,535 | B2 | 9/2003 | Han et al. |
| 6,671,614 | B2 | 12/2003 | Weisman, II et al. |
| 6,675,071 | B1 | 1/2004 | Griffin, Jr. et al. |
| 6,775,601 | B2 | 8/2004 | MacBain |
| 7,637,842 | B2 * | 12/2009 | Tamai et al. ...................... 477/6 |
| 2002/0188387 | A1 | 12/2002 | Woestman et al. |
| 2008/0254938 | A1 * | 10/2008 | Sladek ............................ 477/70 |

FOREIGN PATENT DOCUMENTS

| | | | |
|---|---|---|---|
| JP | 4-277527 | * | 10/1992 |
| JP | 5-277109 | * | 11/1993 |
| JP | 7-230528 | * | 9/1995 |
| JP | 09072226 A | * | 3/1997 |

OTHER PUBLICATIONS

Putting electronics to work in the 1991 car models; Jurgen, R.K.; Spectrum, IEEE; vol. 27, Issue: 12; Digital Object Identifier: 10.1109/6.60944; Publication Year: 1990, pp. 72-75.*

Oil pressure characteristic of automatic transmission's shift control unit and clutch failure analysis; Dong Peng et al.; Computer Application and System Modeling (ICCASM), 2010 International Conference on; vol. 3; Digital Object Identifier: 10.1109/ICCASM.2010.5620269; Publication Year: 2010, pp. V3-42-V3-46.*

Fuzzy immune PID control in VVVF hydraulic system; Beitao Guo; Hongyi Liu; Yang Jiang; Cao Yang; Honghai Tian; Control and Decision Conference, 2009. CCDC'09. Chinese; Digital Object Identifier: 10.1109/CCDC.2009.5195307; Publication Year: 2009, pp. 6154-6157.*

A robust control of the pressure in a control-cylinder for the variable displacement axial piston pump; Ji Min Lee; Sung Hwan Park; Jong Shik Kim; Asian Control Conference, 2009. ASCC 2009. $7^{th}$ ; Publication Year: 2009, pp. 1280-1285.*

Study of PID neural network for hydraulic system; Beitao Guo; Hongyi Liu; Zhong Luo; Fei Wang; Automation and Logistics, 2009. ICAL '09. IEEE International Conference on; Digital Object Identifier: 10.1109/Ical.2009.5262924; Publication Year: 2009, pp: 228-232.*

Fuzzy-PI Damping Control for Hydraulic Crane Tip; Yong Yang; Fuzzy Systems and Knowledge Discovery, 2008. FSKD '08. Fifth International Conference on; vol. 5; Digital Object Identifier: 10.1109/FSKD.2008.56; Publication Year: 2008, pp. 75-79.*

Modelling and simulation of an inductive displacement sensor for mechatronic systems; Drumea, A.; Svasta, P.; Blejan, M.; Electronics Technology (ISSE), 2010 33rd International Spring Seminar on; Digital Object Identifier: 10.1109/ISSE.2010.5547312; Publication Year: 2010, pp. 304-307.*

Model Identification and Control Method Study on Electro-Hydraulic Pressure Servo System; Junpeng Shao; Guihua Han; Yuhong Dong; Zhongwen Wang; Innovative Computing, Information and Control (ICICIC), 2009 Fourth International Conference on; Digital Object Identifier: 10.1109/ICICIC.2009.262; Publication Year: 2009, pp. 68-71.*

Efficiency analysis of an innovative multi-range hydro-mechanical continuously variable transmission; Zhang Mingzhu; Zhou Zhili; Xu Liyou; Automation and Logistics, 2009. ICAL '09. IEEE International Conference on; Digital Object Identifier: 10.1109/ICAL.2009.5262944; Publication Year: 2009, pp. 170-174.*

Adaptive optimal valve control for a resonance fluid actuator ; Koveos, Y.; Tzes, A.; Industrial Electronics, 2009. IECON '09. 35th Annual Conference of IEEE' Digital Object Identifier: 10.1109/IECON.2009.5414723 ; Publication Year: 2009, pp. 1438-1443.*

* cited by examiner

VEHICLE CLUTCH ENGAGEMENT CONTROL SYSTEM AND METHOD

FIELD

The present invention relates generally to vehicle power transfer systems and, more particularly, to a system and method for controlling the engagement of a clutch component of an automatic transmission.

BACKGROUND

Generally speaking, land vehicles require three basic components. These components comprise a power plant (such as an internal combustion engine), a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the transmission. Engine torque and speed are converted in the transmission in accordance with the tractive-power demand of the vehicle. The vehicle's transmission is also capable of controlling the direction of rotation being applied to the wheels, so that the vehicle may be driven in both the forward and backward directions.

A conventional automatic transmission includes a hydrodynamic torque converter to controllably transfer engine torque from the engine crankshaft to a rotatable input member of the transmission through fluid-flow forces. The transmission also includes frictional units which couple the rotating input member to one or more members of a gearset. Other frictional units, typically referred to as brakes, hold members of the gearset stationary during the flow of power. These frictional units are usually brake clutch assemblies or band brakes. The drive clutch assemblies can couple the rotating input member of the transmission to the desired elements of the gearsets, while the brakes hold elements of these gearsets stationary. Some types of automatic transmissions include one or more planetary gearsets in order to provide various ratios of torque and to ensure that the available torque and the respective tractive power demand are matched to one another. Other types of automatic transmissions do not have planetary gearsets, utilizing instead a gearset resembling that of a manual transmission and having selectable gear ratios that are selected by electrically actuated pairs of gears in conjunction with a hydraulic clutch.

In contrast to the manual variety, automatic transmissions are designed to take automatic control of the frictional units, gear ratio selection and gear shifting. In general, the major components featured in such an automatic transmission are: a torque converter as above-mentioned; fluid pressure-operated multi-plate drive or brake clutches and/or brake bands which are connected to the individual elements of the gearsets in order to perform gear shifts without interrupting the tractive power; one-way clutches in conjunction with the frictional units for optimization of power shifts; and transmission controls, such as valves, for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control causes either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it should be appreciated that each transmission design represents a finely tuned arrangement of interdependent valve components. Although this type of transmission control system has worked adequately over the years, it does have its limitations. While each transmission is designed to operate most efficiently within certain specific tolerances, hydraulic control systems are typically incapable of taking self-corrective action to maintain operation of the transmission at peak efficiency. In particular, such hydraulically controlled transmission systems cannot readily adjust themselves in the field to compensate for varying environmental conditions that often affect the operational efficiency of the vehicle transmission.

A particular problem with current automatic transmission designs is control of an oncoming clutch when the vehicle is operated at high altitudes. In order to provide a smooth shift of the transmission, once the oncoming clutch has sufficient capacity, a hydraulic pressure request input to that clutch is normally changed to an upward slope until clutch engagement is complete. However, due to a decrease in engine torque of normally-aspirated engines at high altitudes, a pressure request that would be appropriate at sea level is often too high when the vehicle is operated at higher altitudes. This can result in an aggressive and sudden engagement of the oncoming clutch, which in turn can cause an aggressive, abrupt shift of the transmission. There is a need for a way to adjust the operation of a transmission clutch to compensate for variations in altitude, so that the oncoming clutch is actuated appropriately for the engine torque available at the altitude at which the vehicle is operated.

SUMMARY

In the disclosed invention, the pressure request provided to a transmission clutch is varied in accordance with input data from an altitude sensor. In particular, the magnitude and/or rate of change of the pressure request is adjusted to compensate for variations in the output torque of an engine due to changes in altitude, to create a less sudden (and thus smoother) shift of the transmission.

An aspect of the present invention is a clutch engagement control system for a vehicle transmission. The system comprises an automatic transmission gearset and at least one hydraulic clutch coupled to the gearset. A hydraulic pressure controller is coupled to the clutch. A clutch engagement controller is coupled to the pressure controller, and an altitude sensor is coupled to the clutch engagement controller. The clutch engagement controller is configured to receive from the altitude sensor an altitude signal corresponding to the altitude of the vehicle. The clutch engagement controller adjusts a hydraulic pressure request of the pressure controller in accordance with the altitude signal, such that the clutch engages with at least one of a rate and pressure corresponding to the sensed altitude.

Another aspect of the present invention is a method for controlling the engagement of a clutch coupled to a gearset of an automatic transmission of a vehicle. The method comprises the steps of monitoring at least one of command and condition input signals to determine when the clutch is to be engaged, sensing an altitude signal to determine the altitude at which the vehicle is operating, and generating an altitude-adjusted clutch engagement electrical signal responsive to the input signals. The altitude-adjusted electrical signal is converted to a corresponding altitude-adjusted hydraulic pressure request. The altitude-adjusted pressure request is transmitted to the clutch and the clutch engages with at least one of a rate and pressure corresponding to the sensed altitude.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
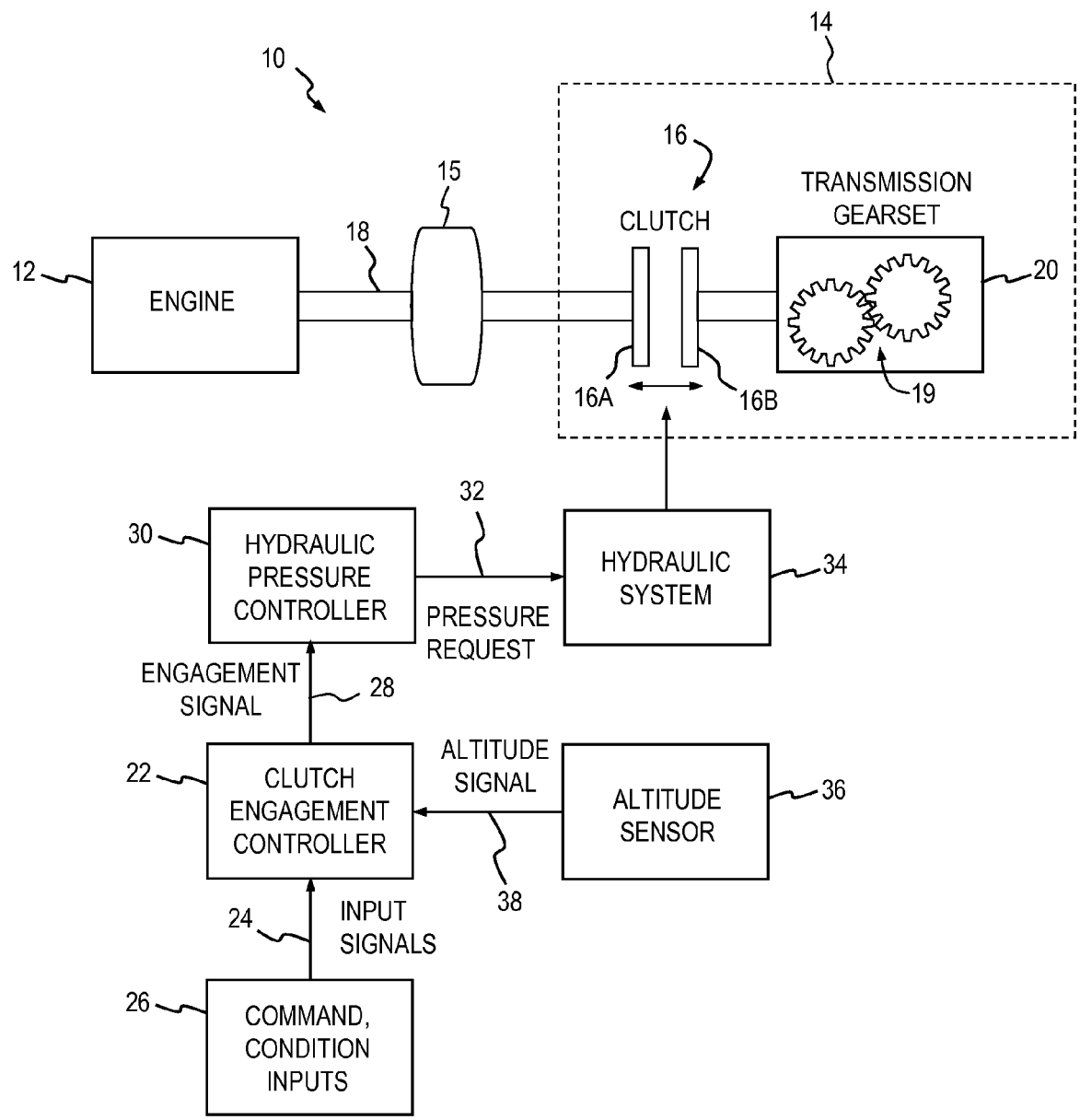
FIG. 1 is a block diagram of a power transfer system according to an embodiment of the present invention.

Components of a vehicle power transfer system 10 relating to several embodiments of the present invention are shown in FIG. 1. It should be noted, for the sake of clarity, that details of components of the vehicle engine, power train and wheels not pertinent to the present invention are not discussed. However, such components and their relationship to the present invention are well-known in the art.

Power transfer system 10 includes an engine 12 and a conventional multiple gear ratio automatic transmission 14 that is controllably coupled to the engine through a torque converter 15. Automatic transmission 14 further includes one or more clutches, represented by clutch 16. Engine 12 is typically a diesel or gasoline engine and has an output member or crank shaft 18 that drives a first friction disc 16A of clutch 16 through torque converter 15. Friction disc 16A selectively engages a second friction disc 16B to operatively couple predetermined rotating members, such as gears 19 of a transmission gearset 20, in any conventional manner to select a predetermined gear ratio. Clutch 16 is a hydraulic-type clutch that is configured to be selectively engaged by means of hydraulic pressure. Gearset 20 is in turn operatively coupled to the wheels (not shown) of a vehicle in any conventional manner to provide tractive power for the vehicle. Means for operatively coupling clutches to gearsets, and gearsets to wheels, are well-known in the art and thus will not be detailed further here.

A clutch engagement controller 22 utilizes predetermined electrical command and condition input signals 24 from various sources 26 such as a transmission selector, engine 12 and transmission 14 to generate an electrical engagement signal 28 relating to actuation of clutch 16. Engagement signal 28 is coupled to a pressure controller 30, which produces a hydraulic pressure request 32 having a hydraulic pressure generally corresponding to the magnitude of engagement signal 28. The pressure request 32 is coupled to a hydraulic system 34, which is in turn coupled to clutch 16. Clutch 16 is configured to be selectively engaged by means of hydraulic pressure generated by pressure request 32.

Clutch engagement controller 22 may be a digital microprocessor-based control unit configured to receive input signals 24 and process same according to control logic to generate an engagement output signal 28 appropriate for the operating condition of the vehicle. Alternatively, clutch engagement controller 22 may comprise other digital architectures utilizing, for example, a computer, microcomputer, microcontroller, programmable logic device and the like. The control logic of clutch engagement controller 22 may be defined by a set of predetermined instructions, such as a computer program or "fuzzy logic." In other embodiments of the present invention portions of clutch engagement controller 22 may be analog, such as an analog closed-loop feedback control system. Clutch engagement controller 22 may be a separate, standalone component or made integral with (or distributed among) other vehicle control components, such as engine or transmission control components. Input signals 24 and engagement signal 28 may be hard-wired to associated system 10 components, or may be provided over a commonly-connected data link conforming to an industry standard protocol, such as SAE J1939 or the like. Engagement signal 28 may be any of an analog, digital and pulse width modulated signal.

Input signal sources 26 may include any types of electrical command and/or condition signals necessary for clutch engagement controller 22 to carry out the aforementioned control logic for clutch 16. Such sources may include, without limitation, an engine controller, shift lever sensor, manual linkage position sensor, transmission input and output speed sensors, shift solenoid status sensor, governor sensor, throttle position sensor, mass airflow sensor, manifold absolute pressure sensor, power control module or computer, differential speed sensor, coolant temperature sensor, intake air temperature, and so on. Input signals 24 may be any combination of analog, digital and pulse width modulated signals.

Pressure controller 30 receives an electrical engagement signal 28 from clutch engagement controller 22 and generates a pressure request 32 having a corresponding hydraulic pressure. Pressure controller 30 may comprise such sub-components as a mechanical or electrical pump to generate hydraulic pressure, a governor to regulate and control the hydraulic pressure level with respect to the speed of the vehicle, and shift valves or pulse-width modulated solenoids to provide a pressure request 32 to hydraulic system 34. The structure and operation of the foregoing components is well-known in the art, and thus will not be detailed further herein.

Hydraulic system 34 is a sealed hydraulic system comprising such components as a reservoir, rigid and flexible hydraulic lines, hydraulic cylinders, connectors, and a suitable hydraulic fluid. Hydraulic system 34 communicates the hydraulic fluid between pressure controller 30 and clutch 16, the pressure in the hydraulic system being controlled by pressure controller 30. The structure and operation of the foregoing components is well-known in the art, and thus will not be detailed further herein.

In operation, clutch engagement controller 22 monitors input signals 24 and, in conformance with predetermined criteria relating to the status and/or values of input signals 24, provides an engagement signal 28 to pressure controller 30. Pressure controller 30 converts engagement signal 28 to a corresponding hydraulic pressure request 32, which is transmitted to clutch 16 by means of hydraulic system 34. An increasing pressure request 32 will cause clutch 16 to increase its degree of engagement while a decreasing pressure request will cause the clutch to decrease its degree of engagement. Thus, the amount of engagement force between discs 16A and 16B is proportional to the magnitude of pressure request 32.

The characteristics of engagement signal 28 and, accordingly, pressure request 32, may be varied to control the operational characteristics of clutch 16. For example, the rate at which clutch 16 engages and disengages may be controlled by controlling the increasing or decreasing rate of change, or "slope," of pressure request 32. This characteristic may be used, for example, to control the rate of engagement at the meet point of clutch discs 16A and 16B to provide smooth engagement of clutch 16.

In order to provide a smooth shift of transmission 14, a pressure request 32 to clutch 16 is normally increased at a predetermined upward rate of change until engagement is complete. However, due to a decrease in engine torque at high altitudes, a pressure request 32 that would be appropriate at sea level may be too great when the vehicle is operated at a high altitude. This can cause an aggressive and abrupt engagement of oncoming clutch 16, which in turn causes an aggressive, physically uncomfortable shift of transmission 14. To compensate for this undesirable condition, an altitude sensor 36 is coupled to clutch engagement controller 22 according to an embodiment of the present invention. Altitude sensor 36 provides clutch engagement controller 22 with an electrical altitude signal 38 that corresponds to the altitude at which the vehicle is operating. As will be discussed in more detail below, clutch engagement controller 22 utilizes the aforementioned control logic to generate, based upon sensor input signals 24 and altitude signal 38, a pressure request 32 having the appropriate magnitude and slopes to achieve a smooth engagement of clutch 16.

Altitude sensor 36 may be any type of sensing device, now known or hereafter invented, that generates an electrical signal relating to the altitude of the vehicle. Examples include, without limitation, barometers, micromachined microelectromechanical systems (MEMS), pressure transducers, and global positioning satellite (GPS) data.

Figure 2:
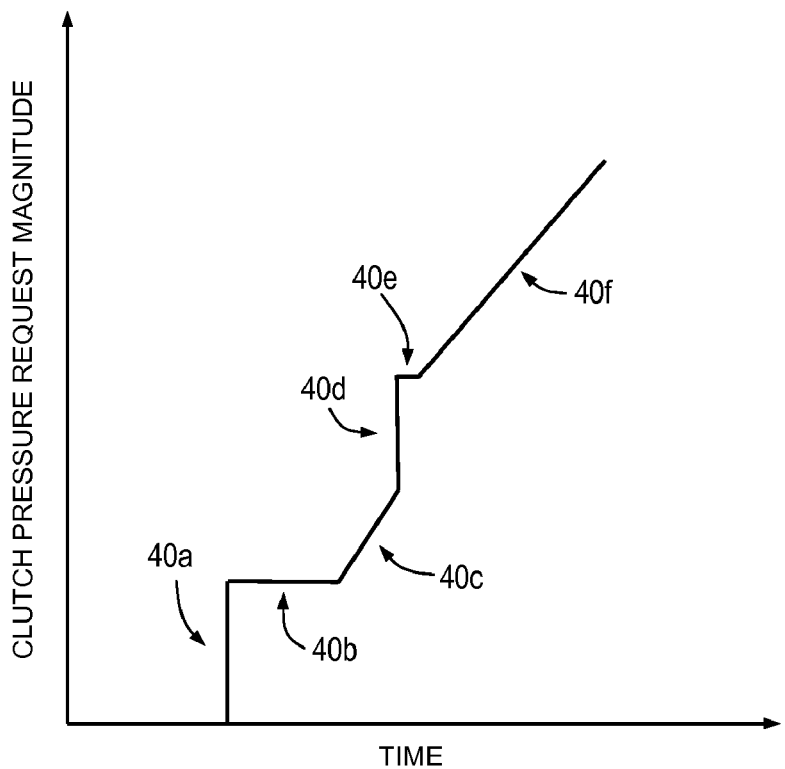
FIG. 2 is a graph of a typical optimum clutch pressure request for a vehicle operating at sea level.

With reference to FIGS. 1 and 2 in combination, FIG. 2 depicts a line graph profiling the pressure of an oncoming clutch 16 pressure request 32 with respect to time, for a vehicle operating at proximate to sea level. As can be seen from graph line 40, the magnitude of pressure request 32 is increased in a predetermined manner. During a first period of time the pressure request 32 is rapidly increased as depicted by 40a, due to the response of components of hydraulic system 34 to the increase in hydraulic pressure. For example, one or more hydraulic cylinders (not shown) of hydraulic system 34 may be filled during this period of time. During a second period of time, which may include an initial static pressure 40b, pressure request 32 is increased at a predetermined rate 40c until oncoming clutch 16 has sufficient capacity. During a third period of time clutch 16 has sufficient capacity to rapidly increase its pressure, as indicated by 40d. During a fourth period of time, which may include an initial static pressure 40e, pressure request 32 for oncoming clutch 16 is again increased at a predetermined rate 40f, providing for smooth engagement rate and pressure of the clutch and, in turn, transmission 14.

Figure 3:
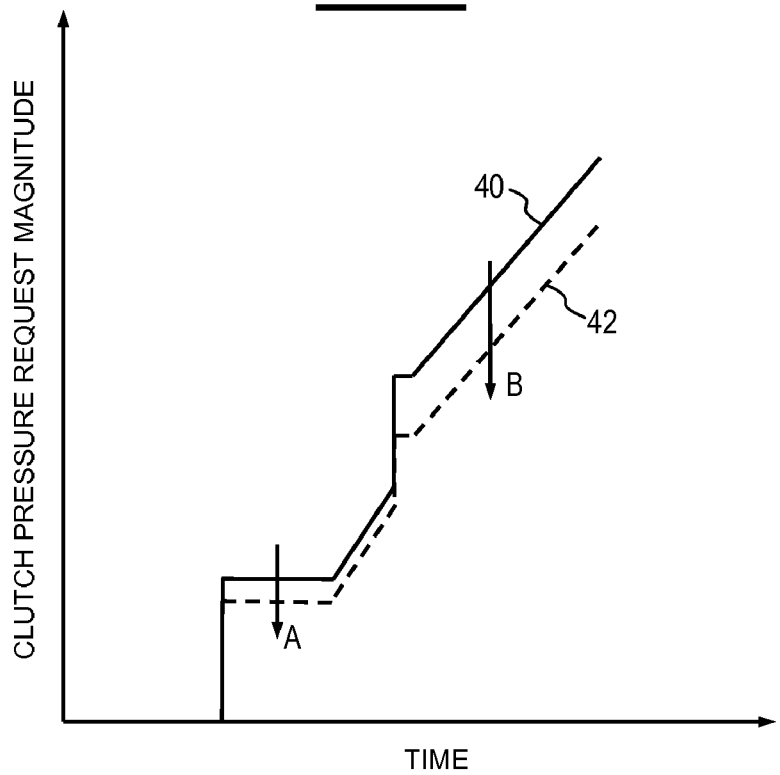
FIG. 3 shows the pressure request of FIG. 2 superimposed with a graph of a typical optimum clutch pressure request for a vehicle operating at a higher altitude.

Referring now to FIG. 3, graph line 40 is shown superimposed with a graph line 42, which represents a typical optimum pressure request 32 for smooth engagement of clutch 16 at higher altitude. As indicated by arrows "A" and "B," graph line 42 is shifted downwardly with respect to graph line 40, representing the need to compensate for the decrease in engine torque at high altitudes in order to allow clutch 16 to engage smoothly. However, as discussed above, current clutch control topologies are designed to operate most efficiently within certain specific ranges or tolerances, and are unable to compensate for varying environmental conditions and maintain operation of the transmission clutches at peak efficiency at high altitudes.

Figure 4:
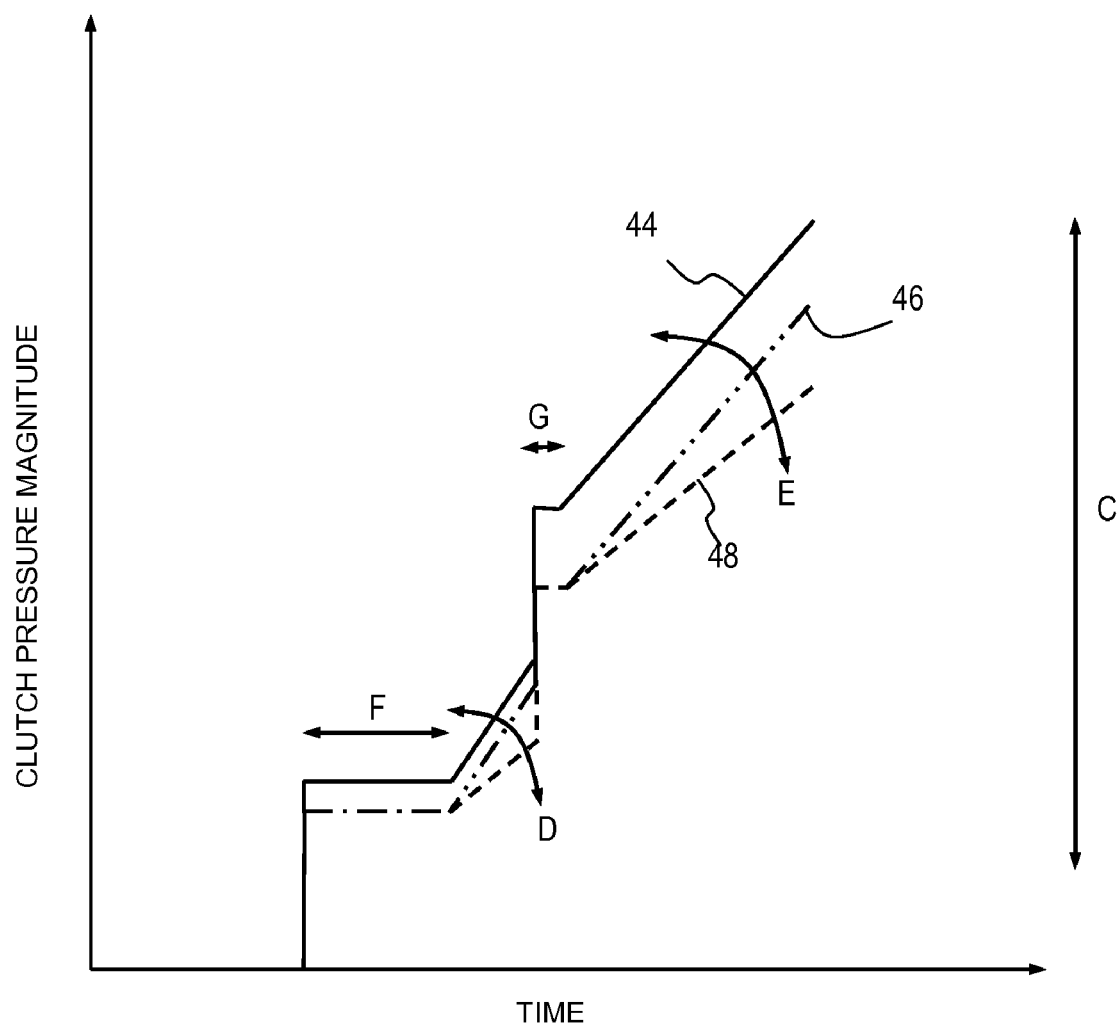
FIG. 4 is a graph of a clutch pressure request according to an embodiment of the present invention, for various altitudes.

Referring now to FIGS. 1 and 4 in combination, a line graph 44 represents pressure request 32 for sea level vehicle operating conditions, according to an embodiment of the present invention. In operation, clutch engagement controller 22 monitors input signals 24 and altitude signal 38 and, in conformance with predetermined criteria relating to the status and/or values of input signals 24 and altitude signal 38, generates a corresponding electrical engagement signal 28 that is appropriate for the altitude at which the vehicle is being operated. Pressure controller 30 converts engagement signal 28 to a corresponding hydraulic pressure request 32, which is transmitted to clutch 16 by means of hydraulic system 34. As shown in FIG. 4, at proximate to sea level, pressure request 32 has a profile generally indicated by graph line 44. At an increased altitude, the pressure request 32 may be shifted downwardly so that clutch 16 engages at a rate and pressure corresponding to the reduced torque produced by the engine at the sensed altitude, as indicated by graph line 46, to provide for smooth operation of the clutch. At some altitudes the slope of pressure request 32 may also be varied so that clutch 16 engages at a rate and pressure corresponding to the further reduced torque produced by the engine at the sensed altitude, in order to smoothly engage the clutch, as indicated by graph line 48. With respect to FIGS. 1 and 4, it can thus be seen that the magnitude of pressure request 32 may be shifted upwardly and downwardly in response to changes in altitude, as represented by arrow "C" and graph lines 44, 46 and 48 in FIG. 4. Likewise, the rates of change in clutch pressure magnitude over time (i.e., slopes) of pressure request signal 32 may be varied in response to changes in altitude, as represented by arrows "D" and "E" in FIG. 4. Further, an initial static pressure level portion of the slopes may be varied, as indicated as arrows "F" and "G" in FIG. 4. Accordingly clutch engagement controller 22 adjusts at least one of the magnitude and rate of change of a hydraulic pressure request 32 of the pressure controller 30 in accordance with the altitude signal 38, such that the clutch 16 engages with at least one of a rate and pressure corresponding to the sensed altitude.

Although only one clutch 16 is shown and described herein, it will be understood that a plurality of clutches may be associated with a transmission 14 in any conventional manner to select a plurality of transmission gear ratios. Each of these clutches may be controlled as described herein.

While this invention has been shown and described with respect to a detailed embodiment thereof, it will be understood by those skilled in the art that various changes in form and detail thereof may be made without departing from the scope of the claims of the invention.

What is claimed is:

1. A clutch engagement control system for a vehicle transmission, comprising:

an automatic transmission gearset;
at least one hydraulic clutch coupled to the gearset;
a hydraulic pressure controller coupled to the clutch;
a clutch engagement controller coupled to the pressure controller; and
an altitude sensor coupled to the clutch engagement controller,
wherein the clutch engagement controller is configured to receive from the altitude sensor an altitude signal corresponding to the altitude of the vehicle, and
wherein the clutch engagement controller adjusts a hydraulic pressure request of the pressure controller in accordance with the altitude signal, such that the clutch engages with at least one of a rate and pressure corresponding to the sensed altitude.

2. The system of claim 1 wherein the clutch engagement controller adjusts the magnitude of the pressure request in accordance with the altitude signal.

3. The system of claim 1 wherein the rate of change of the pressure request is adjusted in accordance with the altitude signal.

4. The system of claim 1 wherein both the magnitude and the rate of change of the pressure request are adjusted in accordance with the altitude signal.

5. The system of claim 4 wherein at least one of the magnitude and rate of change of the pressure request is decreased as the sensed altitude is increased.

6. The system of claim 1, further comprising at least one of a command and a condition input signal coupled to the clutch engagement controller, the command and input signal being generated by at least one input signal source.

7. The system of claim 1 wherein the clutch engagement controller is at least one of a microprocessor, computer, microcomputer, microcontroller, programmable logic device and analog closed-loop control.

8. The system of claim 7 wherein at least one of a microprocessor, computer, microcontroller and programmable logic device further comprises control logic defined by a set of predetermined instructions.

9. The system of claim 1 wherein the altitude sensor is one of a barometer, micromachined microelectromechanical system, pressure transducer, and global positioning satellite data source.

10. The system of claim 1, further comprising a sealed hydraulic system extending between the pressure controller and the clutch.

11. A clutch engagement control system for a vehicle transmission, comprising:
   an automatic transmission gearset;
   at least one hydraulic clutch coupled to the gearset;
   a hydraulic pressure controller coupled to the clutch by a hydraulic system;
   a clutch engagement controller coupled to the pressure controller; and
   an altitude sensor coupled to the clutch engagement controller,
   wherein the clutch engagement controller is configured to receive from the altitude sensor an altitude signal corresponding to the altitude of the vehicle, and
   wherein the clutch engagement controller adjusts at least one of the magnitude and rate of change of a hydraulic pressure request of the pressure controller in accordance with the altitude signal, such that the clutch engages with at least one of a rate and pressure corresponding to the sensed altitude.

12. A method for controlling the engagement of a clutch coupled to a gearset of an automatic transmission of a vehicle, comprising the steps of:
   monitoring at least one of command and condition input signals to determine when the clutch is to be engaged;
   sensing an altitude signal to determine the altitude at which the vehicle is operating;
   generating an altitude-adjusted clutch engagement electrical signal responsive to the input signals;
   converting the altitude-adjusted electrical signal to a corresponding altitude-adjusted hydraulic pressure request; and
   transmitting the altitude-adjusted pressure request to the clutch,
   wherein the clutch engages with at least one of a rate and pressure corresponding to the sensed altitude.

13. The method of claim 12, further comprising the step of adjusting the magnitude of the pressure request in accordance with the altitude signal.

14. The method of claim 12, further comprising the step of adjusting the rate of change of the pressure request in accordance with the altitude signal.

15. The method of claim 12, further comprising the steps of adjusting both the magnitude and the rate of change of the pressure request in accordance with the altitude signal.

16. The method of claim 15, further comprising the step of decreasing at least one of the magnitude and rate of change of the pressure request as the sensed altitude increases.

17. The method of claim 12, further comprising the step of using one of a microprocessor, computer, microcomputer, microcontroller, programmable logic device and analog closed-loop control to generate the altitude-adjusted clutch engagement electrical signal.

18. The method of claim 17, further comprising the step of utilizing a set of predetermined instructions to form control logic for at least one of the microprocessor, computer, microcontroller and programmable logic device.

19. The method of claim 12, further comprising the step of using one of a barometer, micromachined microelectromechanical system, pressure transducer, and global positioning satellite data source to generate the altitude signal.

20. The method of claim 12, further including the steps of increasing the engagement force of the clutch in response to an increasing pressure request, and decreasing the engagement force of the clutch in response to a decreasing pressure request.

* * * * *